United States Patent
Ishiguro

[11] Patent Number: 5,899,548
[45] Date of Patent: May 4, 1999

[54] LIQUID CRYSTAL DISPLAY DEVICE AND METHOD FOR MANUFACTURING SAME

[75] Inventor: Kenichi Ishiguro, Tenri, Japan

[73] Assignee: Sharp Kabushiki Kaisha, Osaka, Japan

[21] Appl. No.: 08/542,942

[22] Filed: Oct. 13, 1995

[30] Foreign Application Priority Data

Oct. 19, 1994 [JP] Japan .................................. 6-253883

[51] Int. Cl.⁶ .................................................. G02F 1/136
[52] U.S. Cl. ................................. 349/47; 349/38; 349/140
[58] Field of Search ............................... 349/47, 38, 140; 257/59, 72

[56] References Cited

U.S. PATENT DOCUMENTS

| | | | |
|---|---|---|---|
| 4,103,297 | 7/1978 | McGreivy et al. | 359/59 |
| 4,648,691 | 3/1987 | Oguchi et al. | 349/162 |
| 5,056,895 | 10/1991 | Kahn | 359/87 |
| 5,182,620 | 1/1993 | Shimada et al. | 349/47 |
| 5,317,432 | 5/1994 | Ino | 257/72 |

FOREIGN PATENT DOCUMENTS 1-33833  7/1989  Japan .

Primary Examiner—Hung X. Dang
Assistant Examiner—Kenneth Parker
Attorney, Agent, or Firm—Nixon & Vanderhye, P.C.

[57] ABSTRACT

An insulated gate TFT (thin film transistor) liquid crystal pixel device driving circuit includes a supplemental capacitive element (condenser) that has the following two insulating films that is sandwiched between one electrode made of non-single crystal (semi-conductive) silicon and another electrode made of a conductor: (1) an insulating silicon-oxide film; (2) an insulating film made of the same material that was used for insulating the gate of the pixel TFT. The supplemental capacitive element is specifically provided with a thicker insulating film portion compared to that of the pixel TFT. Consequently, if the TFT gate insulating film is somehow subsequently thinned, the supplemental capacitive element is less susceptible to the occurrence of defects such as pin holes or the like. As a result, not only is the performance of the pixel TFTs upgraded, but also the reliability of the associated supplemental capacitive elements is increased. Thus, the method and apparatus in accordance with the present invention makes it possible to provide an inexpensive liquid crystal display device having improved performance over conventional TFTs combined with a greater reliability and an increased resistance of the supplemental capacitive elements to voltage spikes or the like.

13 Claims, 3 Drawing Sheets

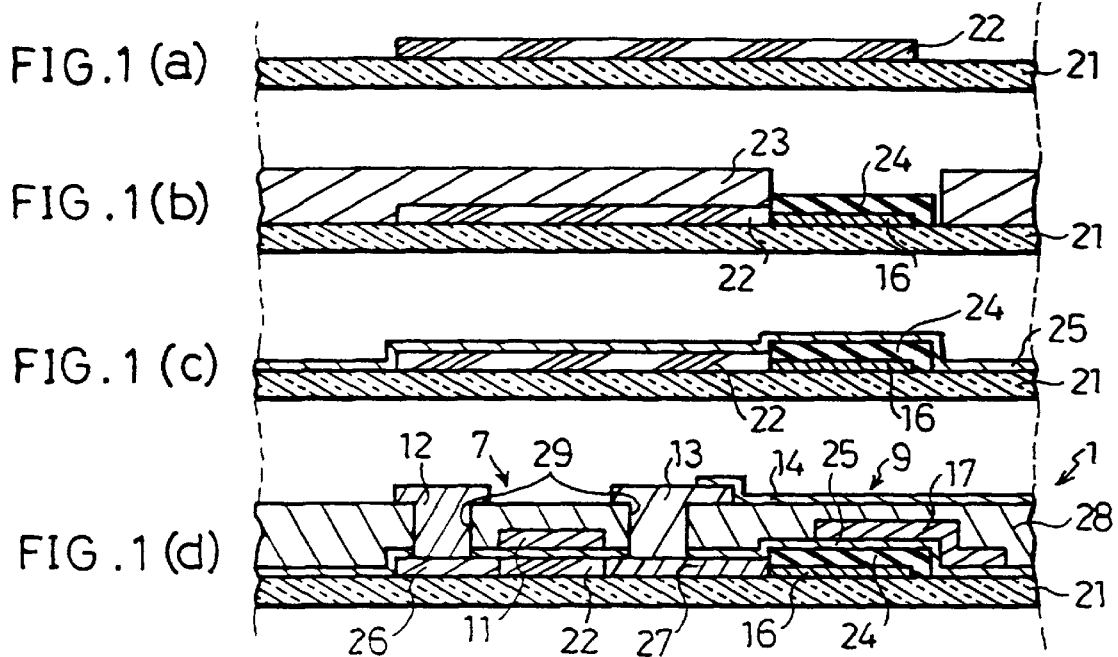
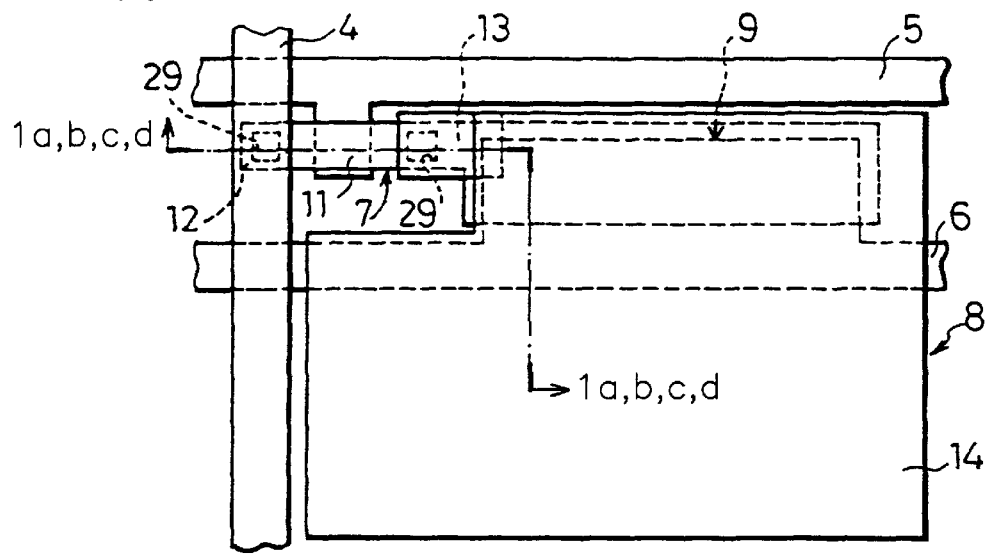

LIQUID CRYSTAL DISPLAY DEVICE AND METHOD FOR MANUFACTURING SAME

FIELD OF THE INVENTION

The present invention relates to active-matrix liquid crystal display devices for flat LCD displays, and to a method of manufacturing the same.

BACKGROUND OF THE INVENTION

Recently, there has been much active development of liquid crystal devices for use in flat panel liquid crystal displays, most notable of which have been the advances in monolithic driver panel design. Parallel to such developments, various types of thin film transistors (hereinafter referred to as TFTs) made of polycrystalline silicon have also been proposed for use in the monolithic driver panel.

In a liquid crystal display device which employs the above-mentioned TFTs and is driven by an active-matrix driving method, each pixel driver includes a supplemental capacitive element (condenser), namely, a signal accumulating capacitor. The structure of such liquid crystal display devices, which is also disclosed by example in Japanese Examined Patent Publication No.1-33833(1989), is further explained in the following paragraphs with reference to FIGS. 5 and 6.

A pixel of a conventional liquid crystal display device comprises a substrate 51 and a semi-conductive layer 56 placed atop of substrate 51. Semi-conductive layer 56 is formed through a predetermined process so that it provides a source area 53 and a drain area 54 as part of TFT 52, and an electrode 55 for a supplemental capacitor 60 (i.e., the supplemental capacitive element). A gate insulating film 57 of TFT 52 is formed on top of semi-conductive layer 56. Also, a gate electrode 58 of TFT 52, another electrode 59 of supplemental capacitor 60, and an inter-layer insulating film 61 are formed on gate insulating film 57. A pixel electrode 62 for pixel 65 (which also exhibits inherent electrical capacitance) is formed on top of inter-layer insulating film 61. A source electrode 63 and a drain electrode 64 are formed on top of source area 53 and drain area 54, respectively. Pixel electrode 62 is electrically connected to drain electrode 64.

According to the above structure, however, supplemental capacitor 60 includes a only single thin insulating film, namely, gate insulating film 57 alone, between two electrodes 55 and 59. Thus, making gate insulating film 57 thinner (which would enhance the performance of TFT 52) results in making the insulating film (i.e., gate insulating film 57) of supplemental capacitor 60 thinner as well. Since insulating film (gate insulating film 57) portion for supplemental capacitor 60 is larger in area than the insulating film portion for TFT 52, making the film thinner more readily causes defects such as pin holes to occur. In other words, if gate insulating film 57 is thinned down to enhance the performance of TFT 52, supplemental capacitor 60 becomes less reliable.

To eliminate this problem, gate insluting film 57 of TFT 52 may be thinned while thickening gate insulating film 57 of supplemental capacitor 60. However, this increases the number of stages in the manufacturing process approximately two-fold as a result (i.e., the number of the stages in the photolithographic process used during device fabrication, including a patterning stage and a film forming stage, is increased approximately two-fold). Consequently, this is an undesirable situation where the yield of liquid crystal display devices during manufacturing decreases and manufacturing costs increase.

SUMMARY OF THE INVENTION

It is therefore at least one object of the present invention to provide a liquid crystal display device which can upgrade the performance of thin film transistors in LCD drivers while maintaining the reliability of the associated supplemental capacitor. The present invention has as another object to provide a method of manufacturing such liquid crystal display devices at improved yield and manufacturing costs compared to that of conventional manufacturing methods.

To fulfil at least the above-mentioned objects, an example liquid crystal display device in accordance with the best presently contemplated embodiment of the present invention comprises:

a plurality of thin film transistors formed on a silicon substrate; and a plurality of supplemental capacitive elements provided for each of the plurality of thin film transistors, respectively, each supplemental capacitive element including, a first electrode made of a doped silicon, the doped silicon being produced by implanting ions into a layer of non-single crystalline silicon, a first insulating film which is formed by oxidizing a surface of the first electrode, a second insulating film which is formed on the first insulating film and also serves as a gate insulating film in each thin film transistor, and a second electrode which is formed on the second insulating film and made of a conductive material.

In accordance with the above structure, two different types of insulating films, i.e. a first and a second insulating film, are formed between the first and second electrodes of each supplemental capacitor. Accordingly, the resulting insulating film portion formed between the first and second electrodes is thicker than the gate insulating film of the thin film transistor. Thus, if the thickness of the TFT gate insulating film is reduced to upgrade the performance, the reliability of the supplemental capacitor is not impaired. Moreover, if this second insulating film is made thinner, even though pin holes or the like develop more readily, the first insluting film secures a sufficient thickness of insulation to make the supplemental capacitor resistant to defects caused by the pin holes. As a result, a liquid crystal display device in accordance with the present LCD driver arrangement can upgrade the performance of thin film transistor while maintaining the reliability of the associated capacitors.

In a preferred embodiment, non-single crystalline silicon also serves as the semi-conductive layer in each thin film transistor and is produced by an ion-implantation of impurities into non-single crystalline silicon whose field effect electron has a mobility of not less than 5 $cm^2/V \cdot s$. Accordingly, each thin film transistor and associated capacitor can be downsized. Also, the yield of the liquid crystal display device is improved and the numerical aperture of the liquid crystal display device can be maintained.

In furtherance of the above-mentioned objects, an example method of manufacturing a liquid crystal display device in accordance of the present invention comprises steps of:

forming a thin film made of non-single crystalline silicon on an insulating substrate;

covering the thin film with a mask in areas other than areas where the said plurality of supplemental capacitive elements are formed; and forming an oxide film by oxidizing a surface of the non-single crystalline silicon in areas exposed through openings of the mask.

According to this method, the oxide film formed by oxidizing the surface of the non-single crystalline silicon layer serves as the insulating film. Thus, if each associated capacitor is made by forming an insulating film, which will also serve as the gate insulating film for the thin film transistor, on top of the oxide film in a conventional manner, the resulting supplemental capacitor includes two different types of insulating films. Accordingly, the supplemental capacitor of the present invention has a thicker insulating film portion compared with one made by a conventional manufacturing method that does not include the step of forming the oxide film. The resulting supplemental capacitor which have the two insulating films is more resistant to defects caused by the pin holes or the like.

In accordance with a preferred embodiment, a photosensitive resin is used as a mask in the above described fabrication process. Accordingly, the mask employed to form the supplemental capacitors can be used again. To be more specific, in a case where an electrode of a supplemental capacitor is formed by an ion-implantation of selected impurities into pre-oxidized non-single crystalline silicon, the mask used for the ion-implantation can be re-used as the mask for forming the oxide film on the surface of the non-single crystalline silicon. Thus, the number of the steps required in the manufacturing process in accordance with the present invention is not increased significantly compared with the conventional method.

It is also contemplated that the manufacturing method for a liquid crystal display device in accordance with the present invention also includes the forming of an insulating film, which serves as a gate insulating film in each thin film transistor, in areas where the plurality of thin film transistors are formed as well as the oxide film formed on the plurality of supplemental capacitors, and further include forming a thin film electrode, which serves as a gate electrode in each thin film transistor, on the insulating film in areas where the plurality of thin film transistors are fomred as well as in areas where the plurality of supplemental capacitors are formed.

Accordingly, the thin film which serves as the electrode of the supplemental capacitor is made of the same material as the thin film serving as the gate electrode for the thin film transistors. As a result, it becomes possible to manufacture an inexpensive liquid crystal display device which provides a substantial upgrade in the performance of the thin film transistors and in the reliability of the associated supplemental capacitors.

For a fuller understanding of the nature and advantages of the invention, reference should be made to the ensuing detailed description taken in conjunction with the accompanying drawings.

BRIEF DESCRIPTION OF THE DRAWINGS

FIGS. 1(a) through 1(d) are cross sectional views through the major functional portion of a single TFT liquid crystal device, as depicted in FIG. 2, showing successive stages of a preferred manufacturing process in accordance with an example embodiment of the present invention;

FIG. 2 is a plan view showing the structure of a part of a pixel of an example liquid crystal display device;

DETAILED DESCRIPTION OF EMBODIMENT

Referring to FIGS. 1 through 4, the following description describes an example embodiment of the present invention.

Figure 3:
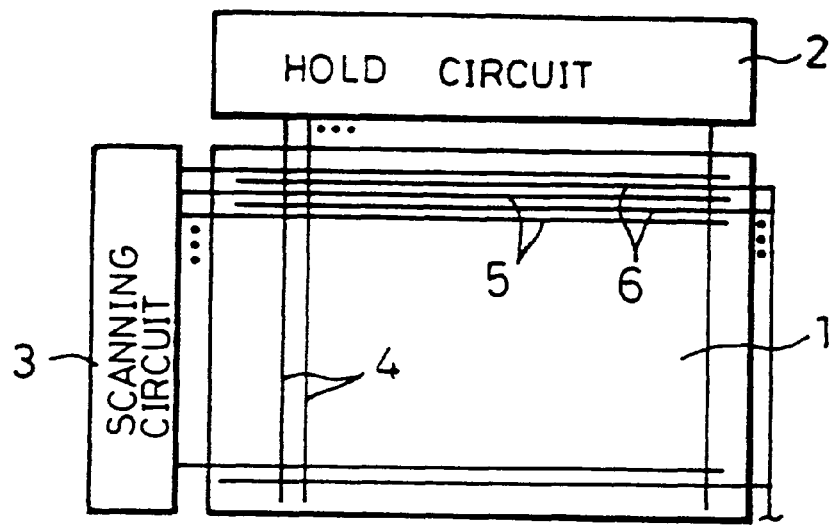
FIG. 3 is a plan view schematically showing the structure of an example liquid crystal display apparatus using the above liquid crystal display device.

An example embodiment of a liquid crystal display device in accordance with the present invention is contemplated for use in a flat display apparatus such as a liquid crystal display apparatus and driven by an active-matrix driving method. As shown in FIG. 3, the liquid crystal display apparatus includes an active-matrix substrate (liquid crystal display device) 1 forming a display unit, a hold circuit 2 for outputting a data signal, and a scanning circuit 3 for outputting a scanning signal.

A plurality of parallel data signal lines (drain bus) 4, a plurality of parallel scanning signal lines (gate bus) 5, and a plurality of parallel supplemental capacitor electrode lines 6 are formed on active-matrix substrate 1. Data signal lines 4 are electrically connected to hold circuit 2 and intersect at right angles with scanning signal lines 5 and supplemental capacitor electrode lines 6. Likewise, scanning signal lines 5 are electrically connected to scanning circuit 3 and supplemental capacitor electrode lines 6 are electrically connected to an unillustrated power source circuit; scanning signal lines 5 and supplemental capacitor electrode lines 6 are parallel with each other. Data signal lines 4, scanning signal lines 5, and supplemental capacitor electrode lines 6 are made of a thin film conductive metal element such as Al, Ti, Ta, Cr, and Cu, or a thin film metal alloy such as Al—Si alloy.

Figure 4:
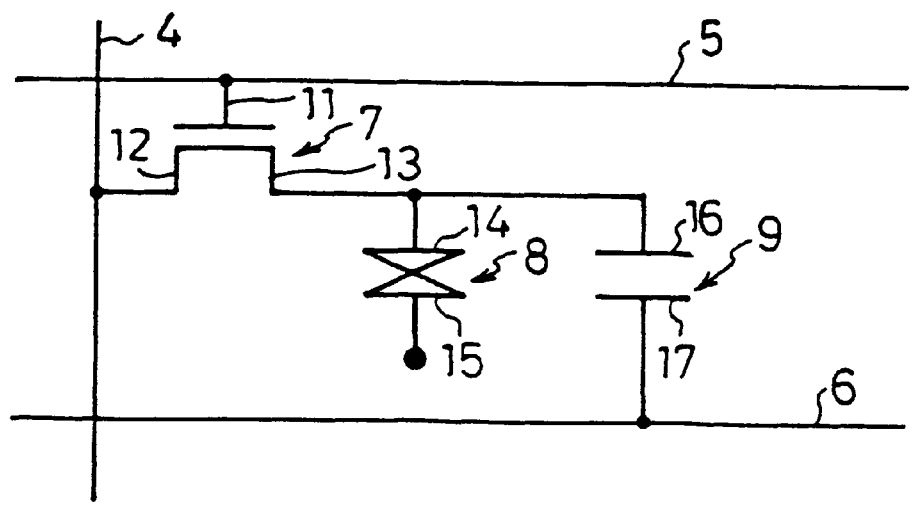
FIG. 4 is a schematic circuit diagram showing electrical connections within the pixel of the liquid crystal display device.
Figure 5:
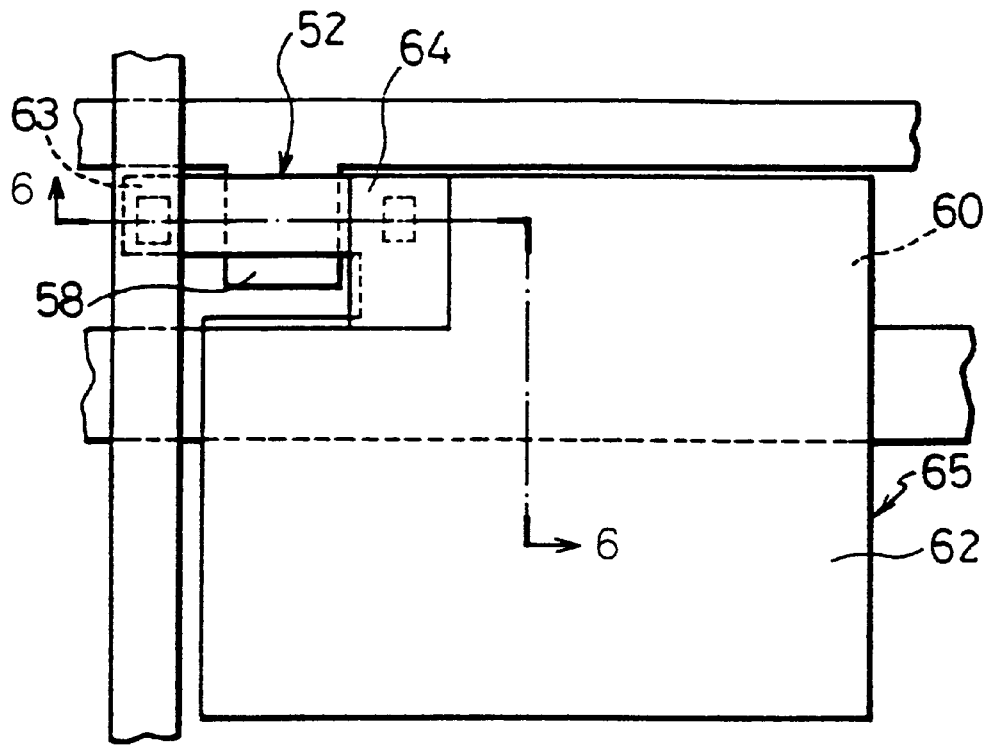
FIG. 5 is a plan view showing the structure of a part of a pixel of a conventional liquid crystal display device.
Figure 6:
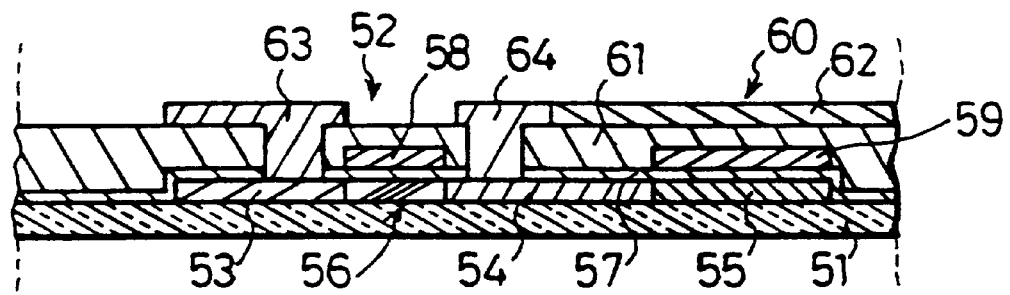
FIG. 6 is a cross sectional view taken on line B—B' of FIG. 5.

As shown in FIG. 4, a circuit consisting of a thin film transistor (hereinafter as pixel TFT) 7 serving as a field-effect transistor, a pixel 8 (having inherent capacitance), and a supplemental capacitor (associated capacitor) 9 serving as a signal accumulating condenser are provided in the vicinity of each intersection of data signal lines 4 and scanning signal lines 5 on top of active-matrix substrate 1. In other words, active-matrix substrate 1 includes an insulating substrate 21 made of glass or a synthetic resin or the like covered with an insulating film, and a number of pixel TFTs 7, pixels 8, and supplemental capacitors 9 which are preferably aligned in a orthogonal matrix configuration on substrate 21 (FIG. 1(d)).

Each pixel TFT 7 is made of a thin film of semiconductive silicon and serves as the active driver for an associated pixel 8. As shown in FIGS. 2 and 4, a gate electrode 11, a source electrode 12, and a drain electrode 13 of pixel TFT 7 are connected to a scanning signal line 5, data signal line 4, pixel 8 and supplemental capacitor 9, respectively. Note that the thin film of polycrystalline silicon is also used for supplemental capacitors 9.

The mobility, $\mu$ (cm$^2$/V·s), of a polycrystalline silicon's field-effect electron is not specified to any particular range; however, it is preferable to limit mobility, $\mu$, to not less than 5.0 cm$^2$/V·s, i.e., $\mu \geq 5$. Forming polycrystalline silicon having a mobility $\mu$ of not less than 5.0 cm$^2$/V·s can result in a substantial decrease in the size required for a pixel TFT and its associated supplemental capacitor while simplifying the structure of hold circuit 2 and the like for at least some of the following reasons:

Each pixel TFT 7 receives data through data signal line 4 and writes the same into the corresponding pixel capacitance and supplemental capacitor 9 within a predetermined time (i.e., a gate ON time). Since an amount of current required to write the data per unit time is directly proportional to the size of the TFT (i.e., channel width) and mobility rating, if the size of the pixel capacity and the gate ON time are a constant, a pixel TFT having a higher mobility rating can be smaller in size compared with those having a lower mobility rating.

The inventor of the present invention conducted a circuit design simulation and analyzed the result, and found that the lower limit of a preferable range for the mobility, $\mu$, is 5.0 cm$^2$/V·s. In other words, when the pixel TFT is made of a thin film of amorphous silicon, the upper limit of the mobility is 5 cm$^2$/V·s; however, the following significant effects are found when mobility $\mu$ is set to not less than the amorphous silicon's upper limit, (i.e., 5.0 cm$^2$/V·s):

1) pixel TFT 7 and supplemental capacitor 9 can be downsized due to an increase mobility rating; and
2) not only the yield of liquid crystal display devices can be improved, but also the numerical aperture of the pixel of the liquid crystal display device can be sustained.

Gate electrode 11, source electrode 12, and drain electrode 13 are made of a conductor consisting of a thin film of metal such as Al, Ti, Ta, Cr, and Cu, or a thin film of metal alloy such as Al—Si alloy. A gate insulating film 25 (FIG. 1(*d*)) of each pixel TFT 7 consists of a thin film comprising, for example, SiO$_2$.

Each pixel 8 comprises a pixel electrode 14 formed on active-matrix substrate 1, an opposing electrode 15 formed on an unillustrated opposing substrate, and an unillustrated liquid crystal layer which is in effect liquid crystals sealed in a section between electrodes 14 and 15. Pixel electrode 14 is electrically connected to drain electrode 13 of TFT 7. Pixel electrode 14 and opposing electrode 15 are made of, for example, a thin film of ITO (indium-tin oxide).

Pixel 8 drives the liquid crystals of the pixel by controlling a voltage applied across pixel electrode 14 and opposing electrode 15, and enables various types of displays by exploiting electro-optical characteristics of the liquid crystals. In short, the liquid crystal display apparatus including active-matrix substrate 1 enables various types of displays by appropriately driving the liquid crystals associated with each pixel.

Supplemental capacitor 9 is a capacitive element appended in parallel to pixel 8. A supplemental capacitance provided in this manner reduces adverse effects on dielectric constants of the liquid crystals in the pixel resulting from an inherent anisotropy, thereby upgrading the display characteristics. As illustrated by FIG. 1(*d*), supplemental capacitor 9 is composed of an electrode (first electrode) 16, an insulating film (first insulating film) 24, a gate insulating film (second insulating film) 25, and another electrode (second electrode) 17. This means that each supplemental capacitor 9 includes two kinds of insulating films: (1) insulating film 24 and (2) insulating film 25 which also serves as the gate insulating film for the associated TFT 7. Electrode 16, one of the two electrodes of supplemental capacitor 9, is electrically connected to pixel electrode 14 of pixel 8, while the other electrode 17 is electrically connected to an external electrode of active-matrix substrate 1 through electrode line 6.

Each supplemental capacitor electrode 16 consists, for example, of a thin film of non-single crystalline silicon, that is doped through ion-implantation of impurities containing, for example, phosphorous or boron into the above-mentioned thin film of semi-conductive silicon forming pixel TFT 7. Insulating film 24 is an oxide film produced by, for example, plasma-oxidation of the surface of the non-single crystalline silicon thin film, or namely, the surface of supplemental capacitor electrode 16. Gate insulting film 25 is substantially formed on top of insulating film 24. Supplemental capacitor electrode 17 is a film made of a metallic conductor, such as a thin film of Al or the like, implying that supplemental capacitor electrode 17 and gate electrode 11 are preferably made of the same film and formed at the same time. Electrode 17 is electrically connected to gate electrode 11. Note electrode 17 of supplemental capacitor 9 may be connected to scanning signal line 5 which is not itself electrically connected to corresponding pixel TFT 7.

As previously explained, supplemental capacitor 9 of the liquid crystal display device of this example embodiment includes an insulating film 24 made of an oxide of non-single crystalline silicon along with insulting film (i.e., gate insulating film 25) made of the same material as gate insulating film 25 of pixel TFT 7, which together are sandwiched by electrode 16 made of non-single-crystal silicon and electrode 17 made of a conductor. In other words, supplemental capacitor 9 includes two kinds of insulating films: (1) insulating film 24 and (2) gate insulating film 25. Hence, the insulating film portion of supplemental capacitor 9 is thicker than that of TFT 7. Thus, if gate insulating film 25 is reduced in thickness to upgrade the performance of TFT 7, the reliability of supplemental capacitor 9 remains intact. More specifically, although pin holes or the like can readily develop when a thinner gate insulating film 25 is used, additional insulating film 24 can make supplemental capacitor 9 resistant to such defects.

As a result, it becomes possible to produce an inexpensive liquid crystal display device which can provide upgraded performance for a pixel TFT while maintaining the reliability of the associated supplemental capacitors.

In the pixel of the liquid crystal display device of the example embodiment, the thin film of non-single crystalline silicon is produced by the ion-implantation into semi-conductive silicon, serving as TFT 7, whose electron mobility, $\mu$, is not less than 5.0 cm$^2$/V·s. When polycrystalline silicon having a mobility, $\mu$, of not less than 5.0 cm2/V·s is used as explained in the above, pixel TFT 7 and supplemental capacitor 9 can be downsized. In addition, not only the yield of the liquid crystal display device can be improved, but also the numerical aperture of the liquid crystal display device can be maintained.

Next, referring to FIGS. 1(*a*) through 1(*d*), the following description describes an example manufacturing method of the above-structured liquid crystal display device. Note that FIGS. 1(*a*) through 1(*d*) are cross sectional views taken on line A—A' of FIG. 2.

To begin with, a semi-conductive layer 22 which is a thin film made of semi-conductive silicon is formed on substrate (i.e., liquid crystal display device substrate) 21 as shown in FIG. 1(*a*). Semi-conductive layer 22 which provides for pixel TFTs 7 and the like is formed by, for example, CVD (chemical vapor deposition) or plasma CVD and low-pressure CVD methods. In one known CVD method, thin films made of amorphous silicon are layered at a low temperature and made into a single film either by solid phase growth at about 600° C. or crystallization through irradiation by a laser beam from an excimer laser or the like. A semi-conductive layer thickness of 50 nm will suffice, and the thickness thereof does not have to be limited to any particular range.

The desired semi-conductive layer 22 is produced in a predetermined shape, for example, by photo-etching. Next, during a patterning stage, a doping mask (mask) 23, which is a thin film comprising an insulator such as a photoresist, $SiO_2$ or $SiN_x$, is formed on substrate 21 as shown in FIG. 1(b). Doping mask 23 is formed in such a manner that it masks all areas other than areas where electrodes 16 of the supplemental capacitor 9 are formed.

Next, during a film forming stage, ionized impurities comprising, for example, phosphorous are ion-implanted into areas which are not covered by doping mask 23 under predetermined implantation conditions. For example, an accelerating voltage of 90 keV and a dosage of $4 \times 10^{15}$. As a result, electrodes 16 are formed out of the non-single crystalline silicon. Subsequently, insulating films 24 are formed, for example, by plasma-oxidizing the surfaces of electrodes 16 in an $O_2$ plasma atmosphere. In other words, doping mask 23 is used when forming electrodes 16 and is used again as a mask when forming insulating films 24. Thus, the number of the stages in the above photolithographic process including the patterning stage, the film forming stage, etc, does not increase significantly compared with that of the conventional manufacturing process.

Once insulating films 24 are made, doping mask 23 is separated from semi-conductive layer 22. (Note that the impurities may include boron instead of phosphorous. Also, the implantation conditions such as the accelerating voltage or dosage are not limited to those mentioned above).

Next, a thin film made of, for example, $SiO_2$, is formed on substrate 21, semi-conductive layer 22, and insulating films 24, as shown in FIG. 1(c). This thin film, which also serves as gate insulating films 25, is made by well known methods. A gate insulating film thickness of 100 nm will suffice, and it need not be limited to any particular range. Gate insulating films 25 are made of $SiN_x$, or a lamination of $SiO_2$ and $SiN_x$ layers.

Next, a thin film of Al that serves as gate electrodes 11 of TFTs 7 and electrodes 17 of supplemental capacitor 9, and additionally as scanning signal lines 5 and supplemental capacitor electrode lines 6, is formed as shown in FIG. 1(d). An Al thin film of 300 nm thick will suffice, and it need not be limited to any particular range of thicknesses. Gate electrodes 11 and electrodes 17 are formed of a metallic thin film made such as Ti, Ta, Cr, and Cu, or a thin film metal alloy such as Al—Si alloy. Further, gate electrodes 11 and electrodes 17 are not necessarily formed together, but may be formed separately.

Subsequently, after forming a diffusion-use window on each gate insulating film 25, ionized impurities containing, for example, phosphorous are ion-implanted into semi-conductive layer 22 in the mapping areas for source 26 and drain 27 areas on TFT 7 under predetermined implantation conditions (for example, an accelerating voltage of 90 keV and a dosage of $4 \times 10^{15}$). As a result, source areas 26 and drain areas 27 are formed. Sections between each area 26 and each area 27 in semi-conductive layer 22 will serve as a channel portion. Note that impurities used for ion-implantation may include boron instead of phosphorous. Also, the implantation conditions such as the accelerating voltage or dose amount are not limited to those mentioned above. However, it is preferable if the same impurities are used when forming electrodes 16 of supplemental capacitor 9, source 26 and drain 27 areas.

Next, inter-layer insulating film 28 comprising a thin film of $SiN_x$ is formed on gate insulating films 25, gate electrodes 11 and electrodes 17. An inter-layer insulating film 28 thickness, for example, of 400 nm thick will suffice. After the inter-layer insulating film is formed, contact holes 29 are formed at the mapping positions for the TFT source 26 and drain 27 areas, respectively. Inter-layer insulating film 28 is made of $SiO_2$, or a lamination of $SiO_2$ and $SiN_x$ layers.

Subsequently, a pair of source electrode 12 and drain electrode 13 both made of Al thin film are formed in each contact hole 29 portion. Electrodes 12 and 13 are about 500 nm thick, but the preferred thickness thereof is not contemplated as being limited to a particular range. Source electrodes 12 and drain electrodes 13 comprise a thin metallic film such as Ti, Ta, Cr, and Cu, or a thin film metal alloy such as Al—Si alloy. Further, source electrodes 12 and drain electrodes 13 are not necessarily formed together, but may be formed separately.

Next, pixel electrodes 14 for pixel 8 are formed of thin film ITO on top of inter-layer insulating film 28. Pixel electrodes 14 are about 100 nm thick, but the preferred thickness thereof is not contemplated as being limited to a particular range. Pixel electrodes 14 are made of a transparent conductive film of $ZnO_2$ or the like.

As evidenced and explained above, one preferred example manufacturing method for a liquid crystal display device in accordance with the present invention includes the following steps:

1) a semi-conductive layer 22 (which is used to from a thin film of conductive silicon) is formed on a substrate 21;

2) the semi-conductive layer 22 is masked by a photoresist doping mask 23 in areas other than areas where supplemental capacitors 9 are formed;

3) after masking, the remaining exposed surfaces of the semi-conductive layer 22 are oxidized to form insulating films 24; and 4) gate insulating films 25 are made on top of insulating films 24, and supplemental capacitor electrodes 17 are formed on top of gate insulating films 25.

In the example embodiment, active-matrix substrate 1 serving as the liquid crystal display device includes a great number of pixel TFTs 7, pixels 8, and supplemental capacitors 9. However, the structure of a liquid crystal display device in accordance with the present invention is not limited strictly to the above described components. For example, a contemplated liquid crystal display device may also include other components (circuits or the like) if necessary.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An active matrix liquid crystal display device, comprising:

a plurality of thin film transistors formed on a silicon substrate; and a plurality of supplemental capacitive elements provided for each of said plurality of thin film transistors, respectively, each supplemental capacitive element including, a first electrode comprising a doped silicon, said doped silicon being produced by implanting ions into a layer of non-single crystalline silicon, a first insulating film formed by oxidizing a surface of said first electrode, a second insulating film formed on said first insulating film and serving as a gate insulating film in each thin film transistor, and a second electrode formed on said second insulating film, said second electrode comprising a conductive material, wherein an insulating film provided between said first electrode and said second electrode is thicker than a gate insulating film of each said thin film transistor.

2. The liquid crystal display device as set forth in claim 1, wherein said non-single crystalline silicon also serves as a semi-conductive layer of each thin film transistor, said non-single crystalline silicon having a field effect electron whose mobility is not less than 5.0 cm$^2$/V·s.

3. The liquid crystal display device as set forth in claim 1 further comprising a plurality of liquid crystal pixel elements driven, respectively, by said plurality of thin film transistors, wherein each supplemental capacitive element is respectively coupled to each pixel element as an additional capacitance.

4. The liquid crystal display device as set forth in claim 1, wherein said second insulating film serving as the gate insulating film in each thin film transistor is made of SiO$_2$.

5. The liquid crystal display device as set forth in claim 1, wherein said second insulating film serving as the gate insulating film in each thin film transistor is made of SiN$_x$.

6. The liquid crystal display device as set forth in claim 1, wherein said second insulating film serving as the gate insulating film in each thin film transistor is made of a lamination of SiO$_2$ layers and SiN$_x$ layers.

7. A method of manufacturing a liquid crystal display device including a plurality of thin film transistors and a plurality of associated supplemental capacitive elements which are respectively provided for said plurality of thin film transistors, said method comprising the steps of:

forming a thin film made of non-single crystalline silicon on an insulating substrate;

forming a supplemental capacitive element for each thin film transistor, each capacitive element comprising a first electrode, a first insulating film formed on the surface of the first electrode, a second insulating film formed on said first insulating film, said second insulating film also serving as a gate insulating film for an associated thin film transistor, and a second electrode formed on the second insulating film, wherein an insulating film provided between said first electrode and said second electrode is thicker than the gate insulating film of each said associated thin film transistor;

covering said thin film with a mask in areas other than areas where said plurality of supplemental capacitive elements are formed; and forming an oxide film by oxidizing a surface of said non-single crystalline silicon in areas exposed through openings of said mask.

8. The method as set forth in claim 7, wherein said mask is a photosensitive resin.

9. The method as set forth in claim 7 further comprising the steps of:

forming an insulating film, which serves as a gate insulating film in each thin film transistor, in areas where said plurality of thin film transistors are formed and on said oxide film formed in areas where said plurality of capacitive elements are formed; and forming thin film electrodes, which respectively serve as a gate electrode in each thin film transistor and as a supplemental capacitive element electrode, on said insulating film in respective areas where said plurality of thin film transistors are formed and areas where said plurality of capacitive elements are formed.

10. The method as set forth in claim 9, wherein said thin film electrodes are formed simultaneously in areas where said plurality of thin film transistors are formed and in areas where said plurality of capacitive elements are formed.

11. The method as set forth in claim 9, wherein said thin film electrodes are formed separately in respective areas where said plurality of thin film transistors are formed and in areas where said plurality of supplemental capacitive elements are formed.

12. An active matrix liquid crystal display device, comprising:

a plurality of thin film transistors formed on a silicon substrate; and a plurality of supplemental capacitive elements provided for each of said plurality of thin film transistors, respectively, each supplemental capacitive element including, a first electrode comprising a doped silicon, said doped silicon being produced by implanting ions into a layer of non-single crystalline silicon, a first insulating film formed by oxidizing a surface of said first electrode, a second insulating film formed on said first insulating film and serving as a gate insulating film in each thin film transistor, and a second electrode formed on said second insulating film, said second electrode comprising a conductive material, wherein said gate insulating film of each said thin film transistor comprises said second insulating film only.

13. A method of manufacturing a liquid crystal display device including a plurality of thin film transistors and a plurality of associated supplemental capacitive elements which are respectively provided for said plurality of thin film transistors, said method comprising the steps of:

forming a thin film made of non-single crystalline silicon on an insulating substrate;

forming a supplemental capacitive element for each thin film transistor, each capacitive element comprising a first electrode, a first insulating film formed on the surface of the first electrode, a second insulating film formed on said first insulating film, said second insulating film also serving as a gate insulating film for an associated thin film transistor, and a second electrode formed on the second insulating film, wherein said gate insulating film of each said thin film transistor comprises said second insulating film only;

covering said thin film with a mask in areas other than areas where said plurality of supplemental capacitive elements are formed; and forming an oxide film by oxidizing a surface of said non-single crystalline silicon in areas exposed through openings of said mask.

* * * * *